US008239275B1

United States Patent
Lyren et al.

(10) Patent No.: US 8,239,275 B1
(45) Date of Patent: Aug. 7, 2012

(54) METHODS AND APPARATUS FOR GENERATING RECOMMENDATIONS FOR GIFTS

(76) Inventors: Philip Scott Lyren, Houston, TX (US); Robert Daniel Sondles, IV, Wadsworth, OH (US)

(*) Notice: Subject to any disclaimer, the term of this patent is extended or adjusted under 35 U.S.C. 154(b) by 684 days.

(21) Appl. No.: 12/047,478

(22) Filed: Mar. 13, 2008

Related U.S. Application Data

(60) Provisional application No. 60/918,148, filed on Mar. 15, 2007.

(51) Int. Cl.
*G06Q 30/00* (2006.01)
(52) U.S. Cl. ...................................................... 705/26.1
(58) Field of Classification Search ................ 705/26, 705/27, 26.1
See application file for complete search history.

(56) References Cited

U.S. PATENT DOCUMENTS

| | | | |
|---|---|---|---|
| 2005/0091120 A1* | 4/2005 | Auletta | 705/26 |
| 2005/0125309 A1* | 6/2005 | Song | 705/26 |
| 2008/0208705 A1* | 8/2008 | Kern et al. | 705/26 |
| 2009/0106100 A1* | 4/2009 | Mashinsky | 705/14 |
| 2009/0232016 A1* | 9/2009 | Pruthi et al. | 370/252 |

OTHER PUBLICATIONS

Leslie Walker; Shopping Sites Tell You More About Yourself; The Washington Post. Washington, D.C.: Dec. 6, 2001. p. E.01; http://proquest.umi.com/pqdweb?did=93616209&sid=8&Fmt=3&clientId=19649&RQT=309&VName=PQD.*

* cited by examiner

*Primary Examiner* — Mila Airapetian

(57) ABSTRACT

One embodiment is a method that monitors, on the computer, activity of a member of a group to build a profile of the member. The profile of the member is used to generate recommendations for gifts that the member wants to receive to celebrate an event. The method then transmits the gifts to a website so other members of the group can select one of the gifts to purchase for the member.

20 Claims, 15 Drawing Sheets

400

Example: Gift Entry Interface

405 Title:

410 Description:

415 URL:
420
425 Price Range:     Priority Gift: ☐
430
435 Ranking:     Family Gift: ☐

440 Group Designation:

445 Gift Owner:

Add Gift
450

Buy List for User A

Sort by Name ▼

User B

810 — Downhill Sled | 11-02-2006 | 820 — Gift Taken

Black or Gray in color, no runners, the kind with the seat and steering wheel. Must have turbo boost!

830 — ( Purchased )

( Return Gift )

URL: www.snowsledswithturboboost.com

Price Range: $10- $15    Ranking: 4

840 — Remote Control Car | 11-03-2006 | 850 — Purchased

Any race car with turbo boost.

860 — ( Not Purchased )

URL: www.racecarwithturboboost.com

Price Range: $40-$60    Ranking: 2

Fig. 8

METHODS AND APPARATUS FOR GENERATING RECOMMENDATIONS FOR GIFTS

RELATED APPLICATIONS

This application claims priority to U.S. provisional application Ser. No. 60/918,148 filed on Mar. 15, 2007.

BACKGROUND

Gifts are traditionally exchanged between family, friends, coworkers, neighbors, etc. during holidays, events, parties and celebrations. Buying a desirable gift for another individual can be a challenging task. The purchaser of the gift may not know what the receiver wants or needs. Furthermore, the purchaser may not know useful information about the receiver, such as clothing size, favorite color, likes or dislikes, or other pertinent information helpful for selecting an appropriate gift.

In some gift exchanges, one individual is selected or designated as a contact for a group of people. The individual can provide different functions, such as coordinate what gifts are being exchanged or make recommendations to others about what gifts to buy.

The method of designating an individual to coordinate a gift exchange can work well for a small group. The method, however, may not be practical for larger groups or for groups having individuals that do not know each other too well. Further, it can be difficult or burdensome to keep track of what each individual wants or needs or what each individual is buying for another group member.

BRIEF DESCRIPTION OF THE DRAWINGS

FIG. 4 is an exemplary interface for a user to enter gift information in accordance with an exemplary embodiment.

FIG. 8 is an exemplary interface showing purchased and not purchased gifts for a user in accordance with an exemplary embodiment.

DETAILED DESCRIPTION

Figure 1:
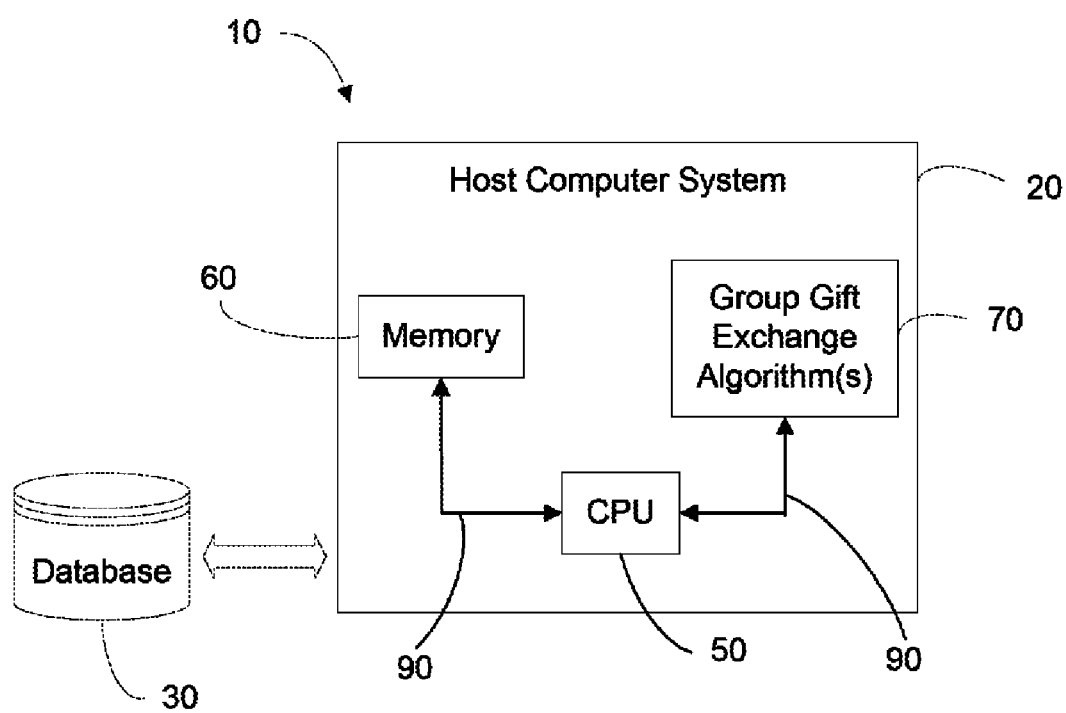
FIG. 1 is a block diagram of a computer system in accordance with an exemplary embodiment.

Embodiments in accordance with the present invention are directed to apparatus, systems, and methods for organizing and facilitating an internet-based gift exchange for a group of people. Members of the group login to an internet website in order to post gift ideas for themselves and view gift ideas for other members of the group. Members can anonymously view and reserve the right to purchase gifts for other members. Gifts can be exchanged in a variety of circumstances, such as celebrating one or more of holidays, birthdays, weddings, special or one-time events, etc.

One exemplary embodiment keeps track of two lists for each member in the group: a Wish List and a Buy List. The Wish List is a list of gifts that the user desires for himself or herself. The Buy List is a list of gifts a group member has chosen to purchase for other members in the group. These two lists are provided to each member so members can both share and consume gift information with other members of the group.

In one embodiment, every member creates a Wish List by entering gifts into a webpage. The Wish Lists are then viewed by other members of the group. The Buy List is a list of gifts, chosen from the Wish Lists of other members, which the member has decided to claim the right to purchase for other group members.

Exemplary embodiments facilitate a group gift exchange by keeping track of the lists and list information for all members of the group. List information is displayed or hidden depending upon the relationship of each user to a particular list. For instance, all members can access and view the availability of every gift on the list of another member. At the same time though, individual members cannot access or view gifts purchased by others for their own Wish List. In other words a member is not able to determine what gifts from his or her Wish List have been selected and purchased by other members.

When a member selects a gift to purchase from the Wish List of another member, the Wish List for that member is automatically updated to signify that the gift is taken and no longer available for purchase by other members. Once a gift is selected, the application automatically updates the gift availability as taken or purchased and lists the chosen gift on the Buy List of the member who selected the gift. In other words, when a gift is chosen and marked as taken or purchased, other members can view the gift as being unavailable to discourage them from buying the same gift.

Exemplary embodiments also provide visual tools for each member to use in preparing for a gift exchange. For example, the application has a budgeting tool that allows each group member to setup a personal budget for purchasing gifts. The tool automatically updates the budget based upon the selected purchases of the user. In one embodiment, the tool maintains a running total of money spent for buying gifts for other members.

During the initial stages of the gift exchange process, a group is established when a user (such as one group member) navigates to an internet website to sign up and create a new group for a gift exchange. The user, for example, can enter the email addresses of other group members. These members of a new group are then invited through email to join the gift exchange. Once the members login in and accept the invitation, the members can create their own personal Wish List by entering information about many different desired gifts.

Members can also enter personal information that assists other members in selecting gifts. For instance, members can enter information such as hobbies, favorite colors, clothes and shoe sizes, topics of interest, etc. As members continue to create their personal Wish Lists, they can also browse Wish Lists of other members.

Once a group member chooses one or more gifts, they can interact with the application by adding the gift to their Buy List. Once a group member purchases some gifts from their Buy List they update their Buy List to mark the gift as purchased. The process is repeated until they have purchased all the gifts from their Buy List or they choose to return a gift from their Buy List back to owner's Wish List.

Exemplary embodiments are utilized with various systems and apparatus. FIG. 1 illustrates an exemplary embodiment as a system 10 for implementing a group gift exchange.

The system 10 includes a host computer system 20 and a repository, warehouse, or database 30. The host computer system 20 comprises of a processing unit 50 (such as one or more processors of central processing units, CPUs) for controlling the overall operation of memory 60 (such as random access memory (RAM) for temporary data storage and read only memory (ROM) for permanent data storage) and one or more group gift exchange algorithms 70 for facilitating and organizing group gift exchanges. The memory 60, for example, stores data, control programs, and other data associate with the host computer system 20. In some embodiments, the memory 60 stores the group gift exchange algorithms 70. The processing unit 50 communicates with memory 60, database 30, group gift exchange algorithm 70, and many other components via buses 90.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, mainframe computers, distributed computing devices, laptops, and other electronic devices and systems whether such devices and systems are portable or non-portable.

Figure 2:
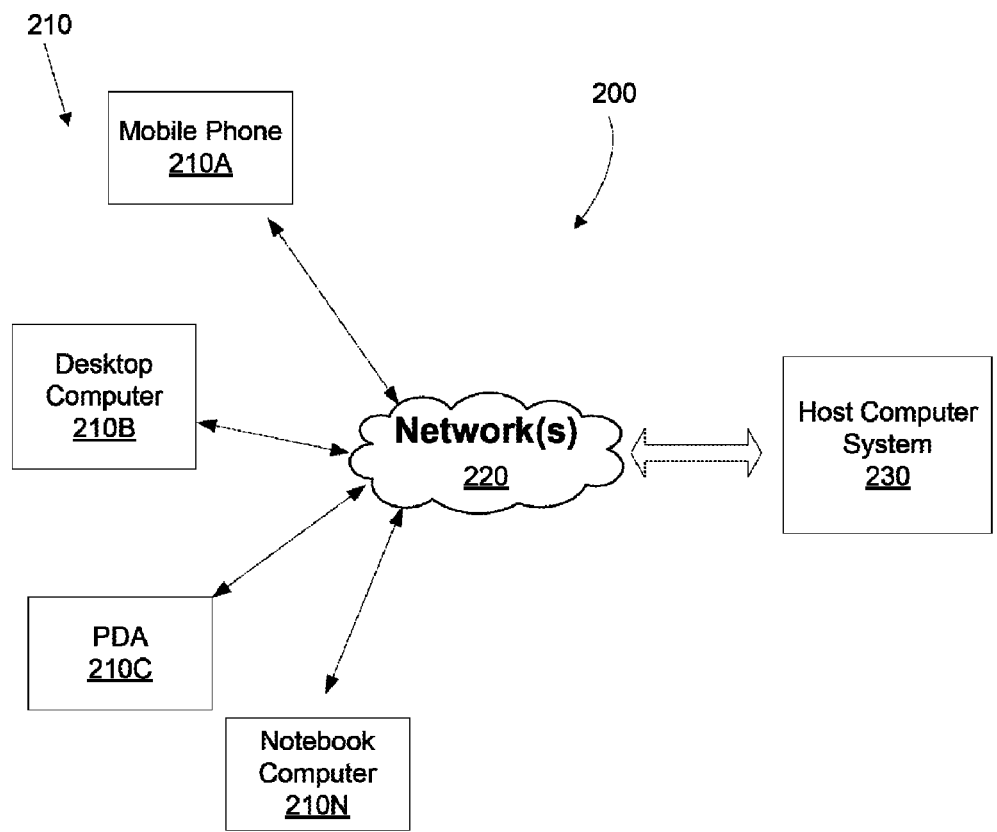
FIG. 2 is a diagram showing plural users connected to the computer system through one or more networks in accordance with an exemplary embodiment.

FIG. 2 illustrates an exemplary system or data processing network 200 in which an embodiment in accordance with the present invention is practiced. The data processing network includes a plurality of computing devices 210 in communication with one or more networks 220 that is in communication with a computer system or server 230.

By way of example, the data processing network 200 can include an Information Technology (IT) infrastructure that comprises one or more of computer systems, networks, databases, and software applications that are responsible for performing information processing. The IT infrastructure can use computers and software to convert, store, protect, process, transmit, retrieve, monitor, and analyze information and communications.

For illustration, multiple users and/or computing devices 210 are shown connected to the host computer system 230. These users and/or computing devices include a wide variety of electronic devices that can connect or access networks 220 (such as the Internet). By way of example, these user and/or computing devices include a mobile phone 210A, a desktop computer 210B, a personal digital assistant (PDA) 210C, and a laptop or notebook computer 210N.

Figure 3:
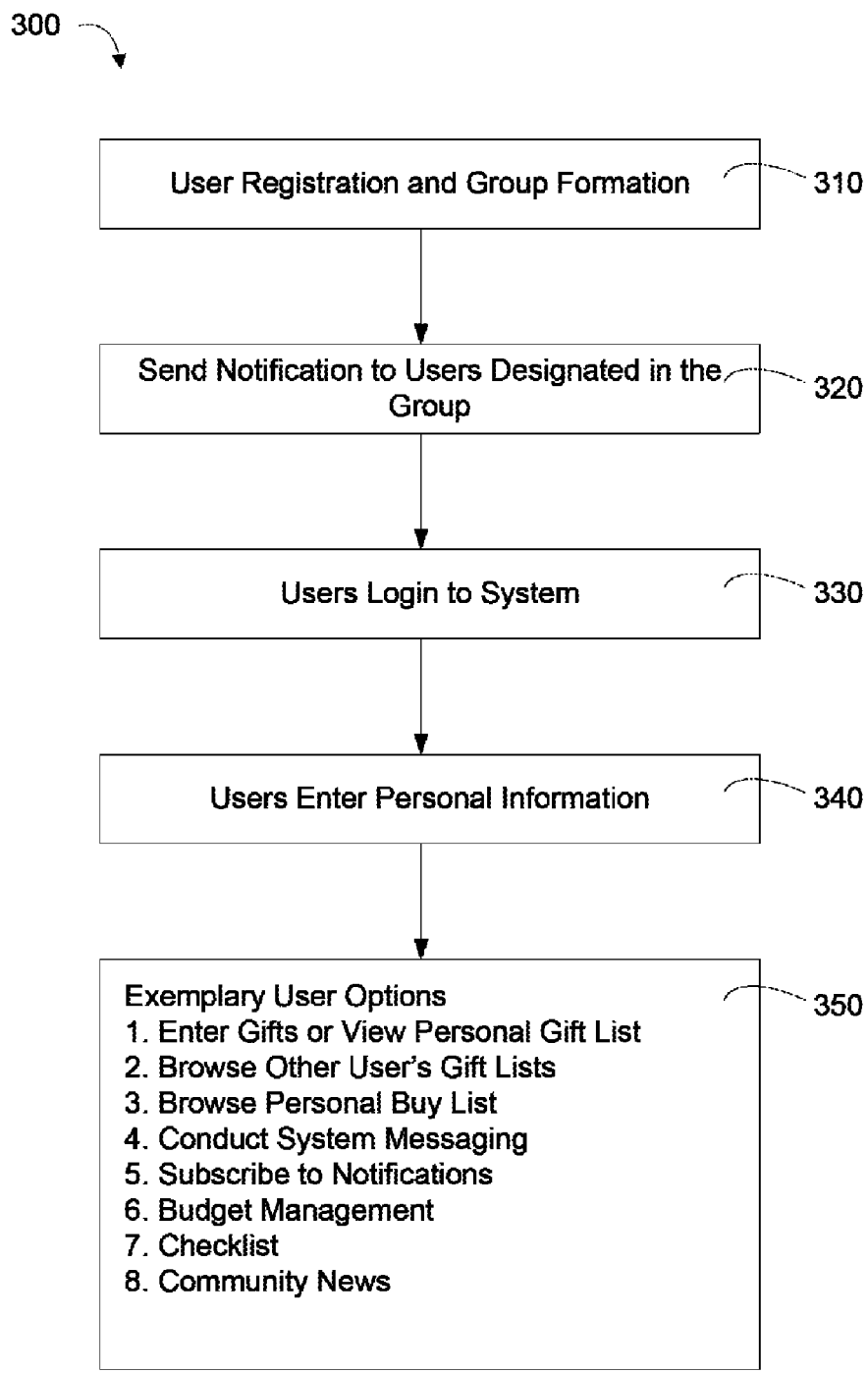
FIG. 3 is a flow diagram of a method for a gift exchange in accordance with an exemplary embodiment.

FIG. 3 is a flow diagram 300 for a user displaying the flow of activities in an exemplary embodiment.

According to block 310, a user navigates to a website and registers with the system. A user initially logs into the system to setup and/or begin a group gift exchange. Here, the user can enter personal information, such as a username, password, email address, name, address, etc. The initial user can be designated as a group coordinator or group founder, for example.

During the initial registration phase, the group coordinator forms a group for an upcoming gift exchange. The group can be formed for a specific event (such as a birthday, a holiday, wedding, special event, etc.) or for a non-specific event for group members to exchange gifts. In order to form the group, the group coordinator enters a group name (for example, John's Birthday Party) and designates one or more other users as group members. By way of example, the other group members are designated with one or more of a name, password, email address, phone number, address, etc.

According to block 320, the system sends notification to other users designated in the group and solicits these users to register and/or accept the invitation to join the group. For example, an email or text message is automatically sent to each user as an invitation to join the group gift exchange established by the group coordinator. The message or invitation can include the name of the group coordinator, a description of the gift exchange (for example, John's Birthday Party), and a hyperlink or Universal Resource Locator (URL) for accessing a website or webpage to join and/or register for the group gift exchange.

According to block 330, the invited users login to the system to register and/or confirm membership to the requested group. Here, each user can enter personal information, such as a username, password, email address, name, address, etc. as shown in block 340.

According to block 350, the users are provided with a variety of user options. Such options include, but are not limited to, one or more of entering gifts for himself or herself, viewing or browsing personal gifts of other group members, browsing personal buy list, conducting system messaging (for example, leaving or transmitting a text or email message to another group member), subscribing to notifications, using various tools (such as a budget management tool), using a checklist, and subscribing to community news, to name a few examples.

FIG. 4 is an exemplary interface 400 (such as a graphical user interface, GUI) for a user to enter gift information in accordance with an exemplary embodiment. This interface enables a user to enter a description of gifts that the user desires for other group members to purchase for him or her.

In one embodiment, the GUI includes various fields, boxes, or data entry location for the user to enter information about the gift. A title field 405 enables a user to provide a title for the gift. A description field 410 enables the user to provide a description of the gift. Some gifts can be available for purchase or viewing on the internet. As such, box 415 enables a user to enter a URL for navigating to the gift. Other boxes include an indication 420 whether the gift is considered a priority or important gift, a price range 425 for the gift, an indication 430 whether the gift is a family gift (i.e., intended for more than one person), a ranking 435 for the gift (i.e., how important is this gift compared to other gifts), a group designation identifier 440, and a gift owner 445 (i.e., for whom is the gift intended). Once the gift descriptive information is entered in the fields, the user clicks on a signal icon 450 to add the gift to his or her Wish List.

Figure 5:
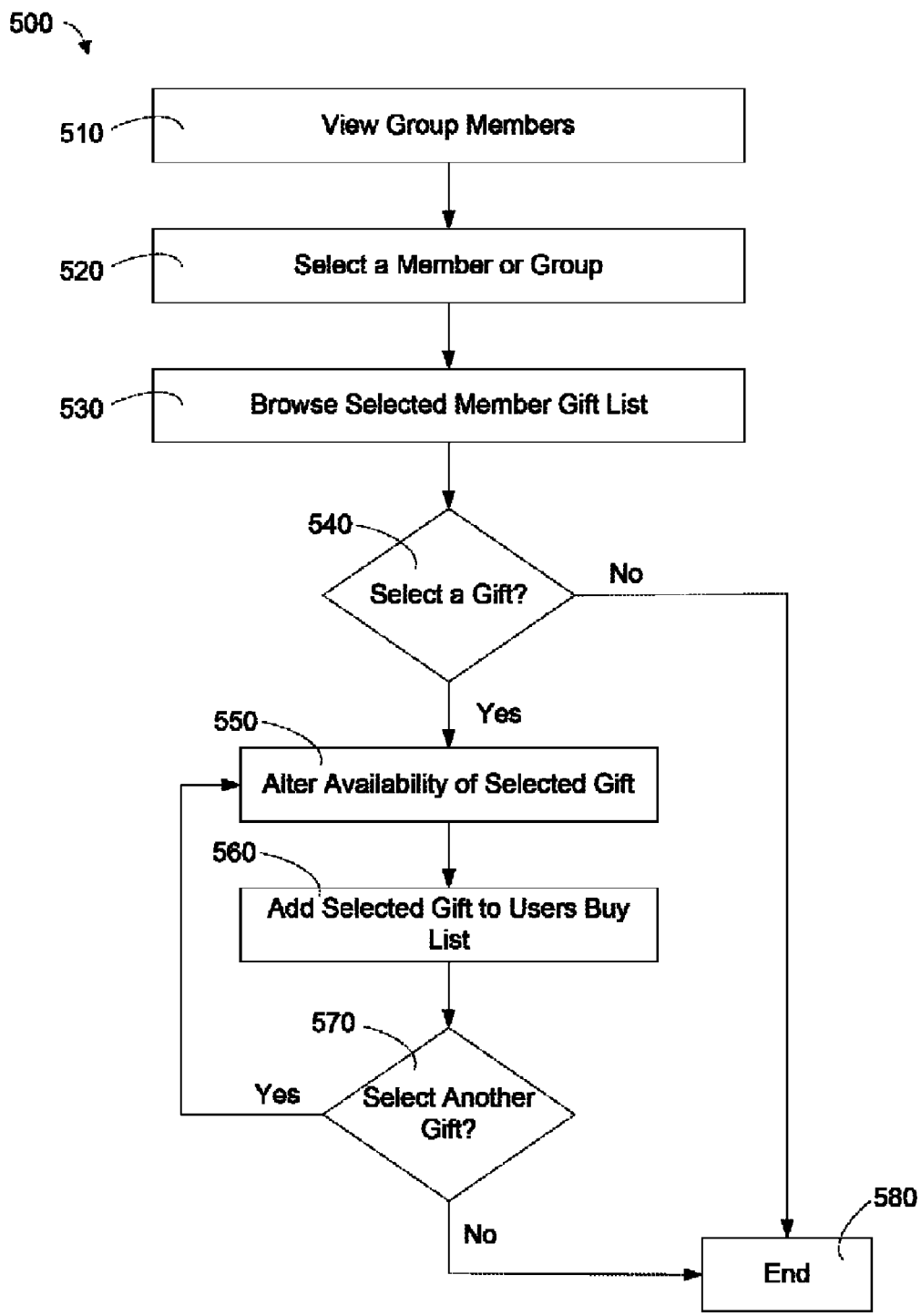
FIG. 5 is a flow diagram of a method for viewing and selecting gifts in accordance with an exemplary embodiment.

FIG. 5 is a flow diagram 500 of a method for viewing and selecting gifts in accordance with an exemplary embodiment. The flow diagram shows the process that a user experiences while choosing one or more gifts for another user within a group. Generally, the starting point is choosing which user's gift list to browse. The user then decides which gift to give the other group member and reserves this gift so other users do not give the same gift to the other group member.

Initially, a user logs into the website or system. Once the user is verified or authenticated, he or she is directed to one or more user groups for which creation and enrollment have already occurred. A user selects one of the groups (if multiple groups exists) and then can view a list of group members according to block 510.

According to block 520, the user selects a member of the group. Alternatively, the user can first select between multiple groups if the user belongs to more than one group. Then the user would select a group member from the selected group.

According to block 530, the user browsed the gifts that have been entered for the selected member. In other words, the user can browse or view the other member's Wish List (i.e., the gifts that the other user designated as being wanted or desired for the gift exchange).

According to block 540, a question is asked whether the user desires to select a gift for the other member. If the answer to this question is "no" then flow proceeds to block 580 and the method ends. Here, the user could be taken to a home page of the gift exchange, choose to browse a Wish List belonging to another member or navigated to another website location.

If the answer to the question is "yes" then flow proceeds to block 550 where the availability of the selected gift is altered in the system. At this stage, the user has decided to select a specific gift for another member. Before the user selected the gift, the gift was designated as being available (i.e., able to be chosen by any group member). After the user selects the gift, however, this designation changes to unavailable so another member cannot also select the same gift. This change in designation prevents two group members from selecting the same gift for the same group member.

According to block 560, the selected gift is added to the users Buy List. In other words, the system tracks which gifts the user has selected to buy for other group members.

According to block 570, a question is asked whether the user desires to select another gift for a group member. If the answer to this question is "no" then flow proceeds to block 580 and the method ends. If the answer to this question is "yes" then flow proceeds to block 550.

Once a user selects or purchases a gift from the Wish List of another user, other members of the group are prohibited or prevented from selecting or purchasing the same gift. This process ensures that two different users do not select and purchase the same gift for one of the users. Users can be prevented from selecting a gift in a variety of ways. For example, gifts that are previously selected can be visibly be designated as not available for selection or purchase. For example, the screen or GUI can display a box, icon, or note indicating that the gift is not available for selection. Further, a user can be prevented from selecting such a gift as the selection option is not available or displayed to the user. If the user attempts to select the gift, the user is provided with a notice notifying the user that the gift is not available or previously selected by another user. For instance, a warning can appear on the display or screen stating that the gift is taken or not available. Alternatively, once a gift is selected, this gift could be visibly deleted from other users. Thus, users will not be aware that such a gift was on a user's Wish List since the gift will not appear on their screen or display.

Figure 6:
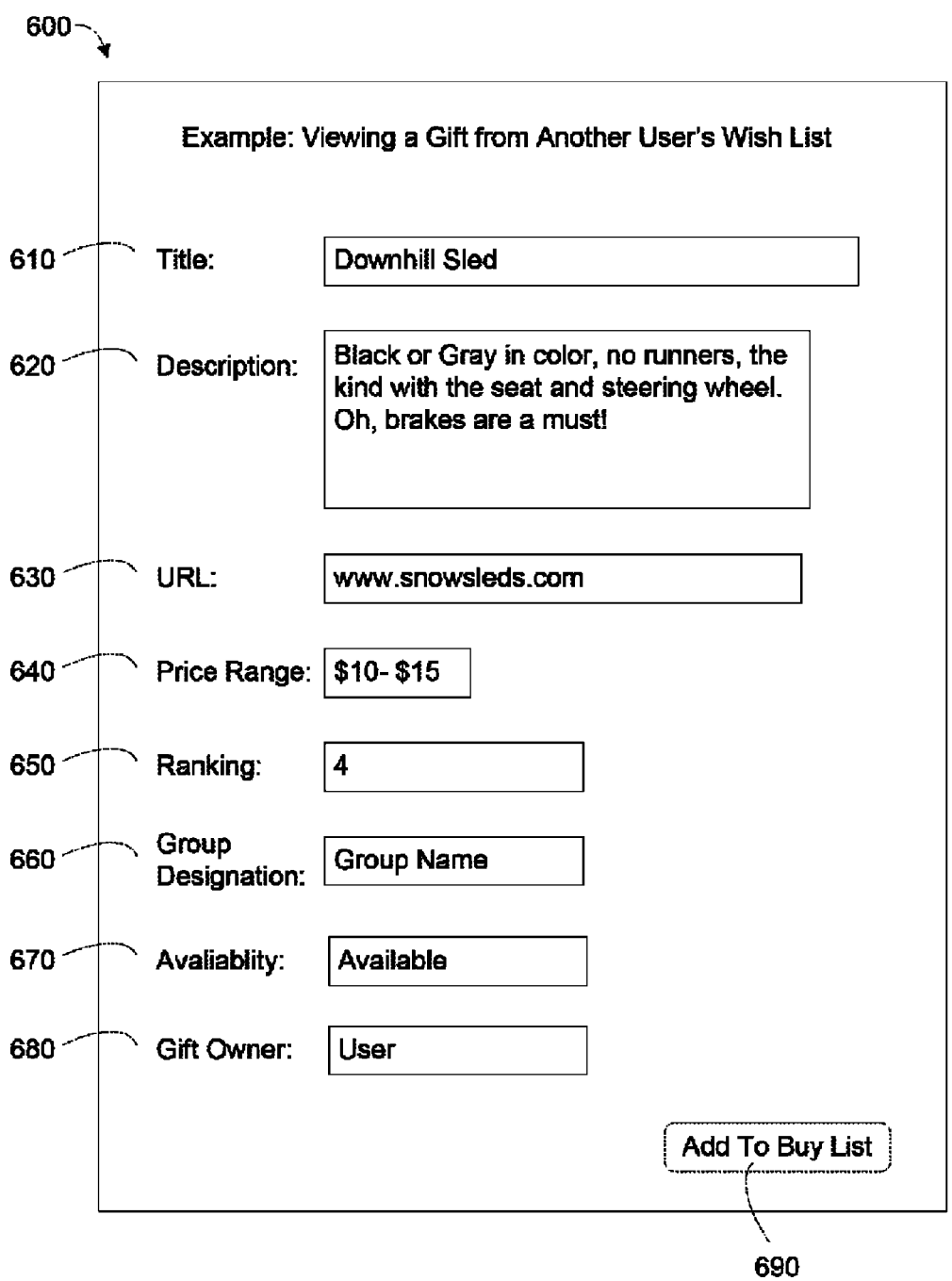
FIG. 6 is an exemplary interface for viewing a gift lift list of a user in accordance with an exemplary embodiment.

FIG. 6 is an exemplary interface 600 for viewing a Wish Lift belonging to a user in accordance with an exemplary embodiment. For instance, the figure provides an exemplary interface of a gift from another user's Wish List.

The user can select a gift from the Wish List of another member. Once this selection is made (for example, the user clicks on or selects with a menu option) a particular gift, detailed information about the selected gift is presented to the user. By way of example, this information includes, but is not limited to, one or more of fields shown in GUI 600. Title 610 shows the title of the gift provided by the other member (for example, downhill sled). Description 620 provides the description of the gift that was previously entered by the gift owner. This description explains that the other member desires a downhill sled with black or gray color, no runners, a seat, a steering wheel and brakes. URL 630 provides a URL for navigating to view or purchase the desired gift (here, a URL for purchasing the downhill sled). The other displayed boxes or fields include price range 640, ranking 650 for the gift, group designation 660 (for example, showing the group name), availability 670 (showing whether this gift has been previously selected or chosen by another group member), and gift owner 680 (showing for whom the gift is intended). The icon 690 enables the user to select the displayed gift for purchase.

The gift display interface shows the availability status 670 as well as the gift owner. This information provides a distinction or difference between a user viewing their personal Wish List and a user viewing another user's Wish List. A user cannot view the availability status of his or her taken gifts, as this would ruin the surprise of gift giving. In other words, the user is not able to determine which of his gifts have been selected for purchase by the other members.

Figure 7:
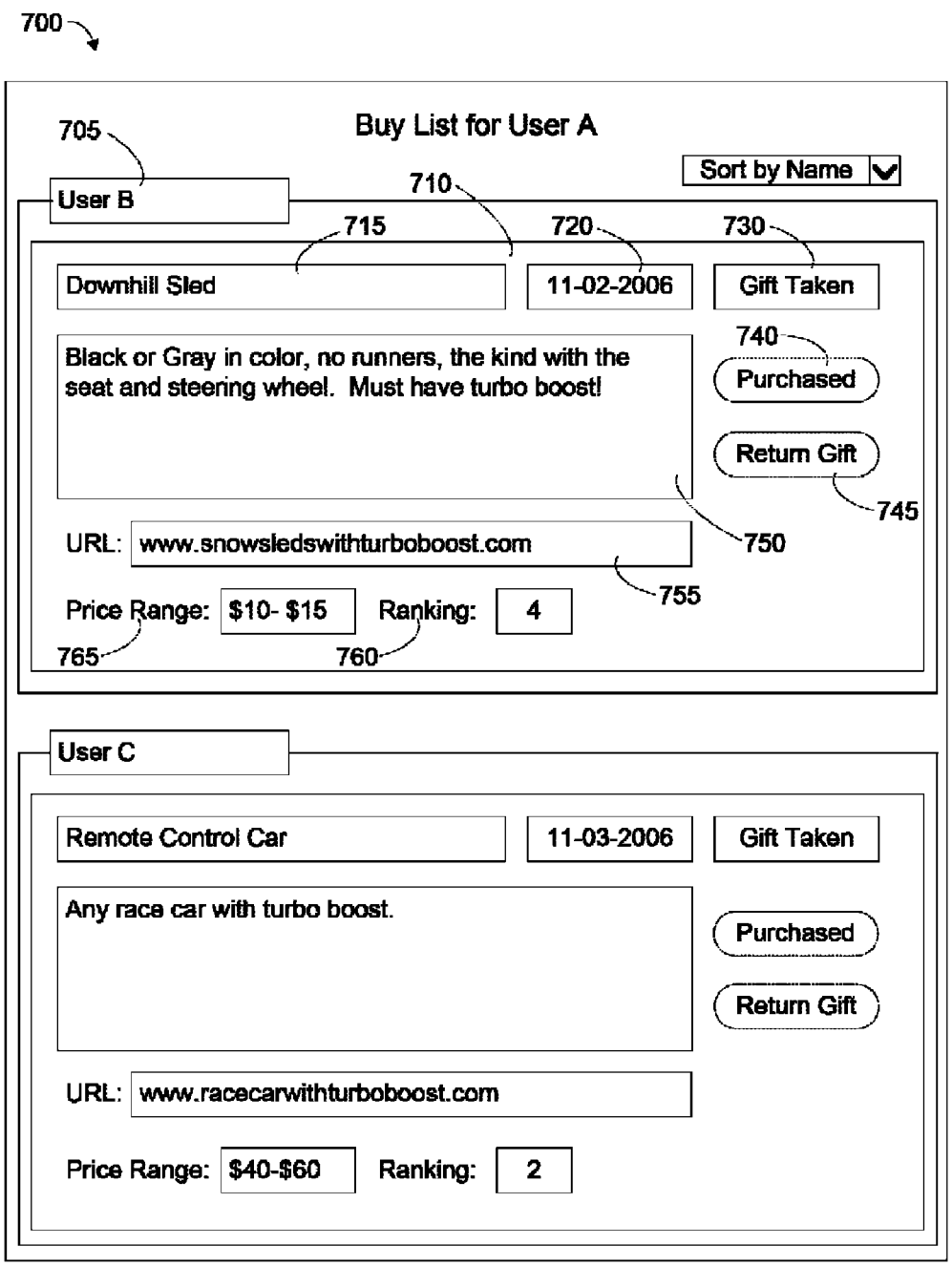
FIG. 7 is an exemplary interface for buying a gift for a user in accordance with an exemplary embodiment.

FIG. 7 is an exemplary interface 700 for buying a gift for a user in accordance with an exemplary embodiment. The Buy List for a user represents the gifts that the user has selected to buy for other group members. The system keeps track of which gifts to user has chosen or designated to buy for one or more of the other members.

FIG. 7 shows that user A has selected to buy a downhill sled for user B and a remote control car for user C. These gifts appear on the Buy List because user A browsed through the respective Wish Lists for users B and C and chose gifts to purchase for these other users. The Buy List helps organize which gifts are purchased and which need to be purchased. This information is only visible to the Buy List owner. In other words, once a gift is added to the Buy List the gift can be marked as purchased for the benefit of the Buy List owner. The owner of the Buy List can return to their Buy List and update the purchase status of the gift to "Purchased", update a gift previously marked as "Purchased" back to "taken" or remove the gift making it available for other users to purchase. The gifts are organized by username in this exemplary embodiment.

FIG. 7 shows various fields or boxes that assist a user in organizing, viewing, and tracking which gifts have been selected. One field 705 designates a specific user; for example, showing a selected gift 710 for user B. The gift is enclosed in the box identified by 710. Region 715 shows the gift title (for example, a downhill sled) with the gift being selected or chosen for purchase by user A on a date 720 (for example, Nov. 2, 2006). Purchase status field 730 indicates that the gift is taken (i.e., selected for purchase by user A), and block 750 provides a description of the gift. Other items include the toggling purchased icon 740 (enabling user A to indicate to the system that the designated gift has actually been purchased or not purchased for user B), return gift icon 745 (indicating that user A will no longer buy the gift and it can be re-designated as available for the other members to select and the gift is removed from user A's Buy List), URL 755, ranking 760, and price range 765.

FIG. 8 is an exemplary interface 800 showing purchased and not purchased gifts for a user in accordance with an exemplary embodiment. Exemplary embodiments track or record which gifts have been purchased by the user. The user is able to see which gifts are purchased and which gifts still need to be purchased. The purchase status is only seen by the owner of the Buy List.

FIG. 8 shows that user A has selected to purchase two gifts for user B. These gifts include a downhill sled, shown in gift title box 810, and a remote control car, shown in gift box 840. Box 820 shows that the downhill sled gift is taken (i.e., user A has designated or claimed the right to buy this gift for user B). Once user A buys the gift, user A can select icon 830 to indicate the gift is purchased. Once a gift is purchased, an indication is provided to user A that this gift was previously purchased. For example, box 840 is colored, hashed, or otherwise marked with a different background to indicate that the remote control car is purchased. Icons 830 and 860 are used to change the purchase status field (820 and 850) for this gift as being purchased or not purchased.

Figure 9:
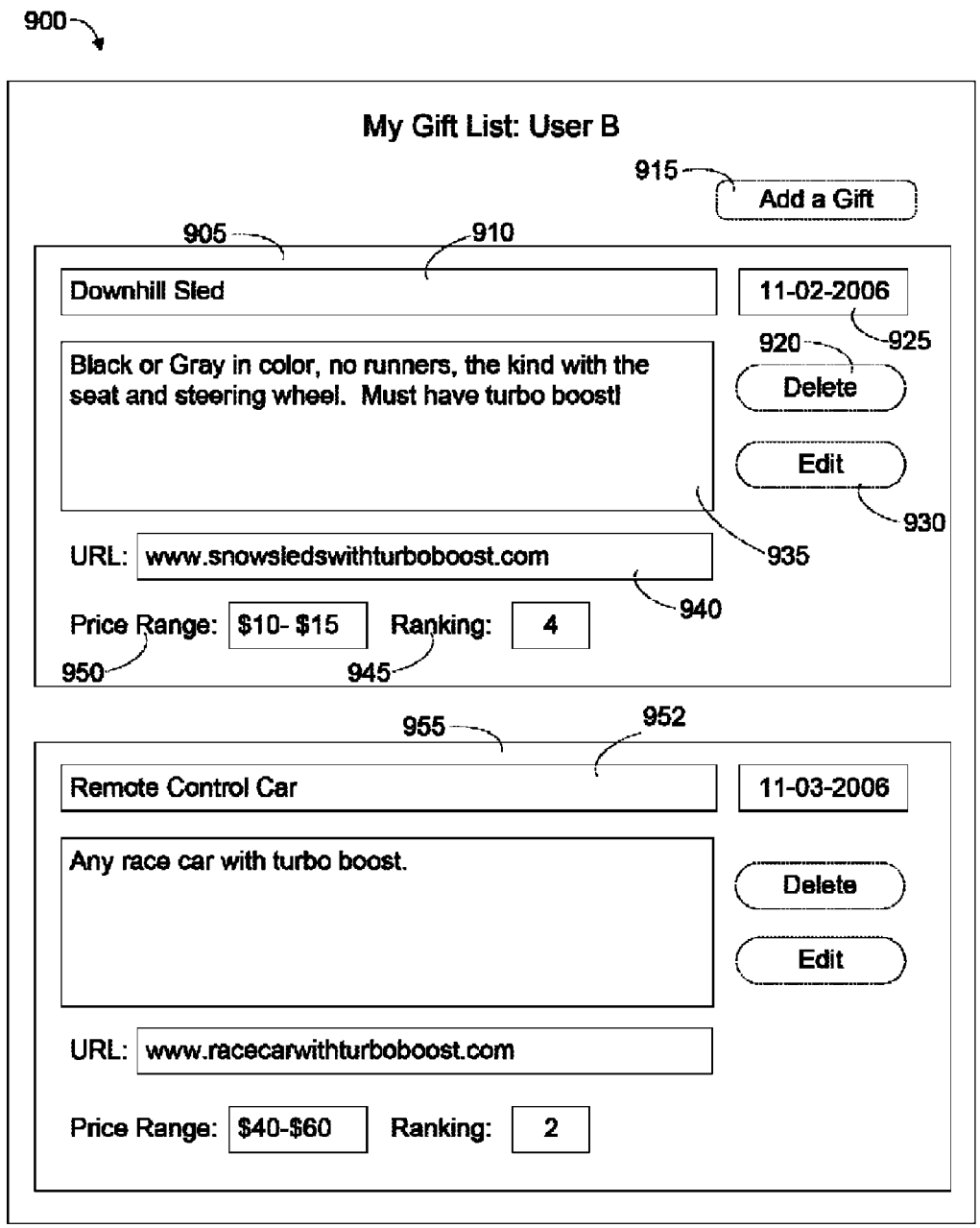
FIG. 9 is an exemplary interface showing a gift list for a user in accordance with an exemplary embodiment.

FIG. 9 is an exemplary interface 900 showing a gift list for a user in accordance with an exemplary embodiment. This figure illustrates the gift list (or Wish List) for user B. In other words, the display lists or shows which gifts that user B wants other group members to buy for user B. Note in this example that the availability status of the gift is not shown. Also note the ability to delete and edit each gift, shown by the appearance of the buttons on the GUI. The gift list owner is the only user that can see this view of his or her gift list, unless he or she has authorized another member from their subgroup to view the list.

As shown in FIG. 9, user A has two gifts on the gift list: a downhill sled shown in field 910 of box 905 and a remote control car shown in box 955 of field 952. Field 905 includes various other fields or boxes, such as delete 920 (enabling user B to delete a gift from his or her list), a date field 925 (showing the date on which the gift was entered into the system), an edit icon 930 (enabling the user to edit the gift), a description field 935 (providing a description of the gift), a URL field 940 (providing a hyperlink on the internet to the gift), ranking 945 (showing the level of importance of the gift for the user B), and a price range 950 (showing a price range for the gift). Lastly, icon 915 is selected when user B wants to add a new gift to his or her gift list, the system presents an interface such as exemplary interface 400 in FIG. 4.

Figure 10:
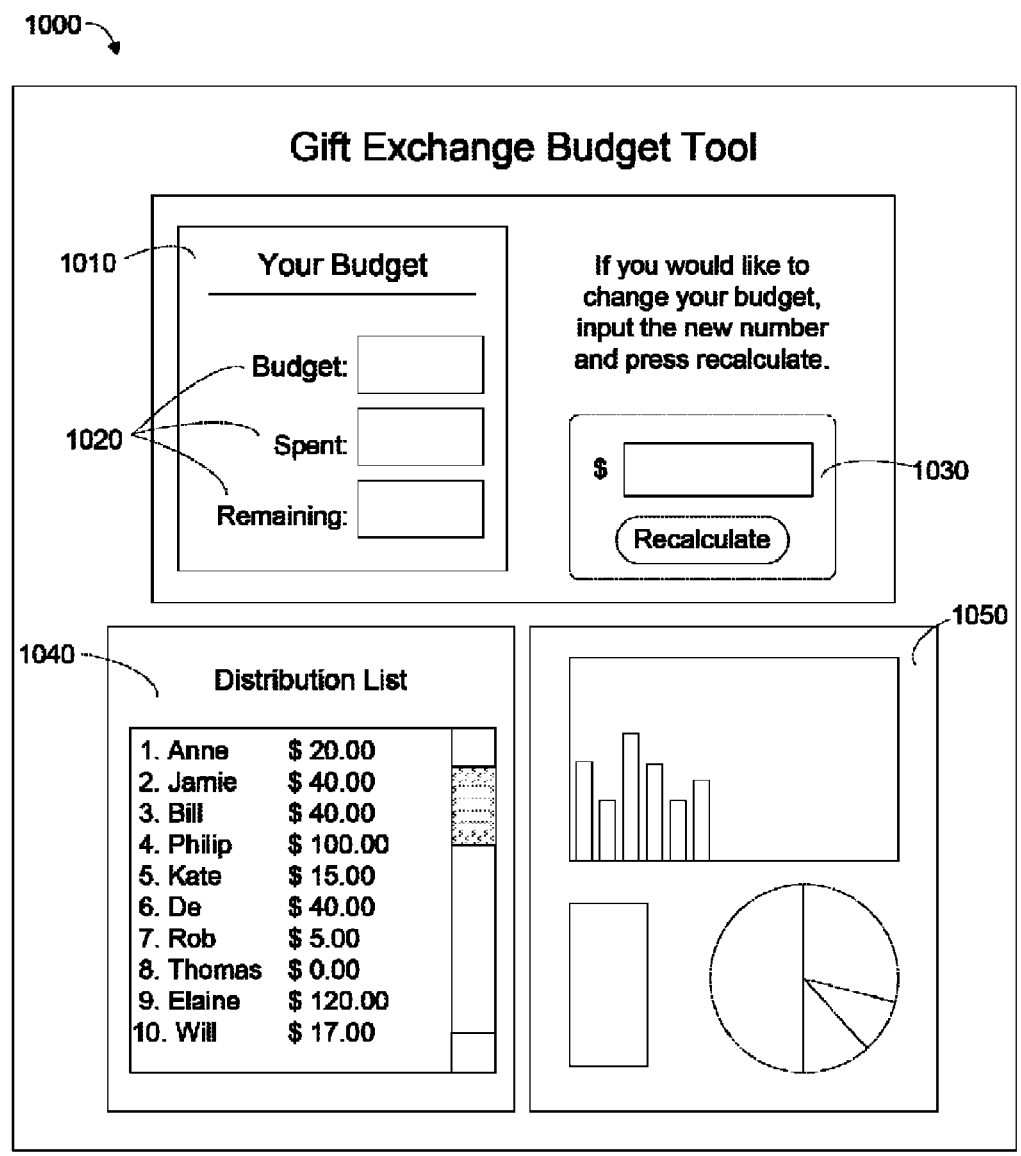
FIG. 10 is an exemplary interface of a budget tool for a gift exchange in accordance with an exemplary embodiment.

FIG. 10 is an exemplary interface 1000 of a budget tool for a gift exchange in accordance with an exemplary embodiment. The gift exchange budget tool is one of the many optional tools available to each user. This tool enables the user to enter a maximum spending amount into the analysis tool that creates multiple views of the data for the user, such as a bar chart, pie chart, quick numbers view and gift cost breakdown per user. The gift exchange budget tool also uses the current purchases to determine the remaining amount of gift capital.

By way of example, the GUI 1000 provides a budget field 1010 wherein the user can enter a dollar amount or budget amount for a particular group exchange or for individual group members. The budget field includes amounts 1020 that are entered and/or automatically calculated as the user buys gifts for members. For example, assume user A budgets $100 for gifts in a gift exchange. If user A then purchases a gift for $20 for user B, the budget of user A is automatically updated to show user A spent: $20 and remaining: $80.

A recalculation field 1030 is also provided so a user can change or adjust the budget. Further, a distribution list 1040 shows how the money is being distributed between various members of the group. By way of example, the user has spent $20 on Anne, $40 on Jamie, $100 on Philip, etc. One or more graphs, charts, diagrams, etc. (shown at 1050) can be simultaneously displayed as a visual indication of the budget for the gift exchange.

Figure 11:
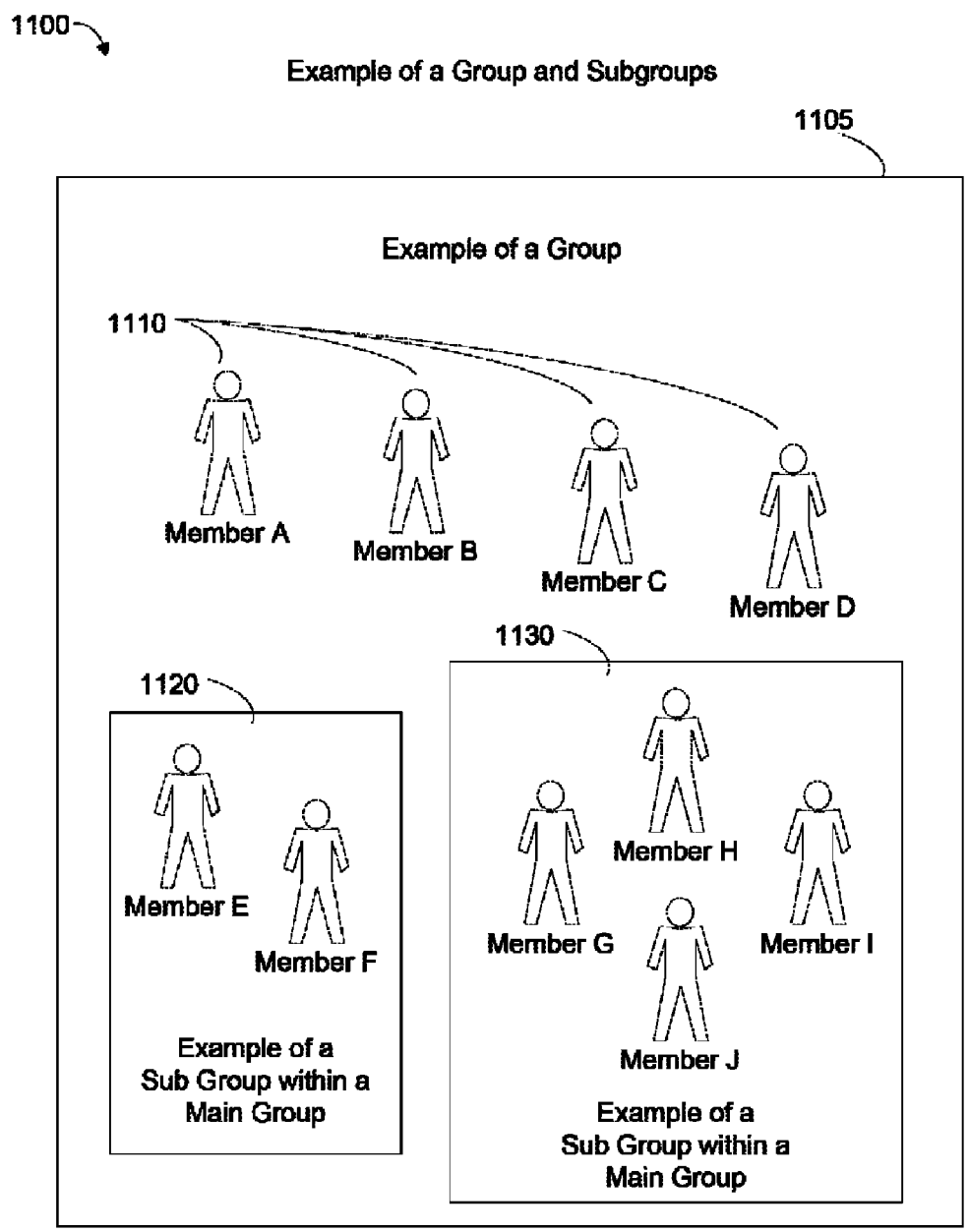
FIG. 11 is a diagram of a different user groups in accordance with an exemplary embodiment.

FIG. 11 is a diagram 1100 of a different user groups in accordance with an exemplary embodiment. This figure helps explain the idea of groups and subgroups in the exemplary embodiment. The large box 1105 that forms the perimeter is the group (labeled as "Example of a Group"). Within this group are various individual members 1110 (shown as members A, B, C, and D) and subgroups 1120 and 1130. The members can be single users or subgroups of people. The members of the group all exchange gifts with some or every member or subgroup of the group. For instance, members E and F exchange gifts with each other and with members A, B, C and D, while members G, H, I, and J exchange gifts with each other and members G, H, I and J. Members A, B, C, and D can exchange gifts with each other or members of subgroups 1120 and/or 1130.

Figure 12:
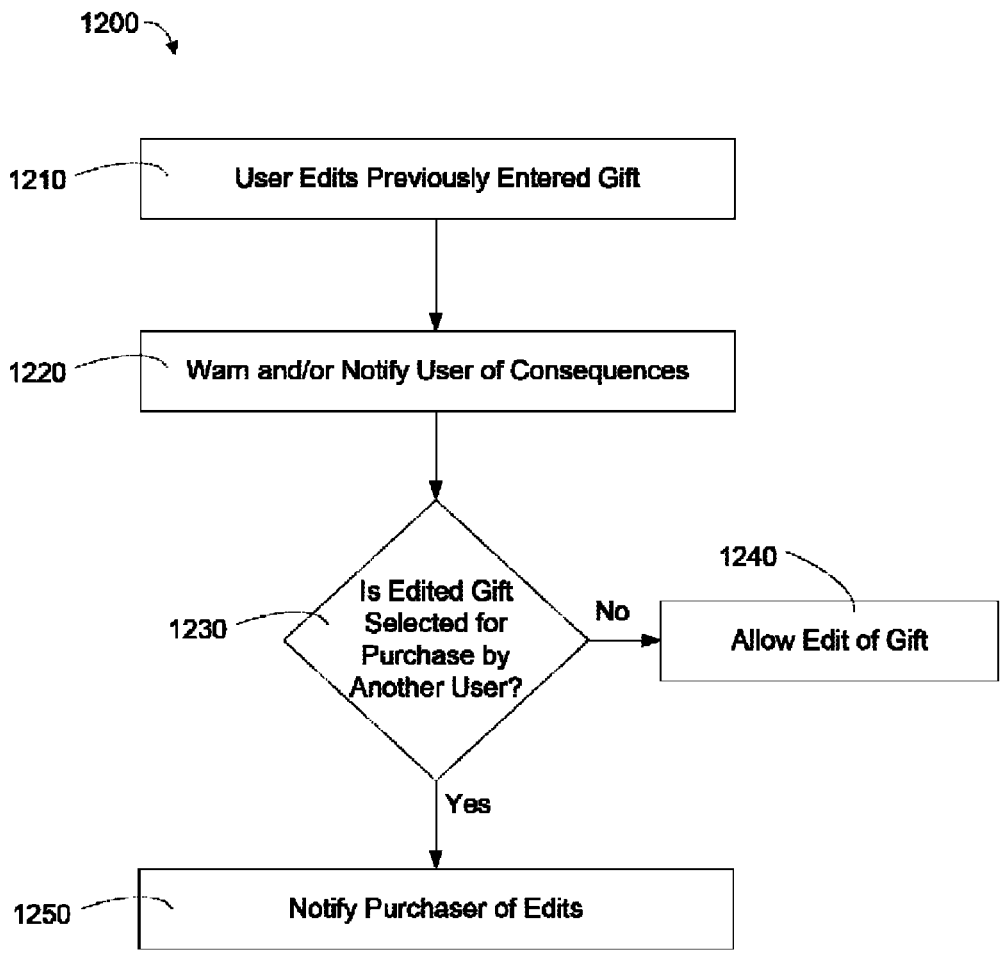
FIG. 12 is a flow diagram for editing a gift in accordance with an exemplary embodiment.

FIG. 12 is a flowchart 1200 for the process of a user editing one of his or her own gifts after it has been posted to his or her own Wish List.

According to block 1210, a user edits a previously entered gift. For example, the user decides to remove a gift after the gift was previously added to his or her Wish List.

According to block 1220, the user is warned or notified of consequences of editing the gift. For example, the user is warned that another user may have already purchased or selected the gift.

According to block 1230, a question is asked whether the edited gift has been previously selected for purchase by another member. If the answer to this question is "no" then flow proceeds to block 1240, and the updates are made to the gift. In this instance, no other member has selected to gift. So, the user can edit the gift without consequence since another user has not promised or selected it for purchase. If the answer to the question is "yes" then flow proceeds to block 1250. Here, updates are made to the gift and the other member is notified that the user has edited the gift. In other words, if the user chooses to edit the gift and another member has taken the gift, that member is notified of the changes immediately after they happen.

By way of example, suppose user A provides a gift, titled downhill sled, with black as a color preference. User B then selects to purchase this gift for user A. Later, user A changes the description to indicate red as the preferred color preference. User B is immediately notified (for example, through an email or text message or notification of some kind within the system) that user A has changed an attribute such as the description of the gift.

Figure 13:
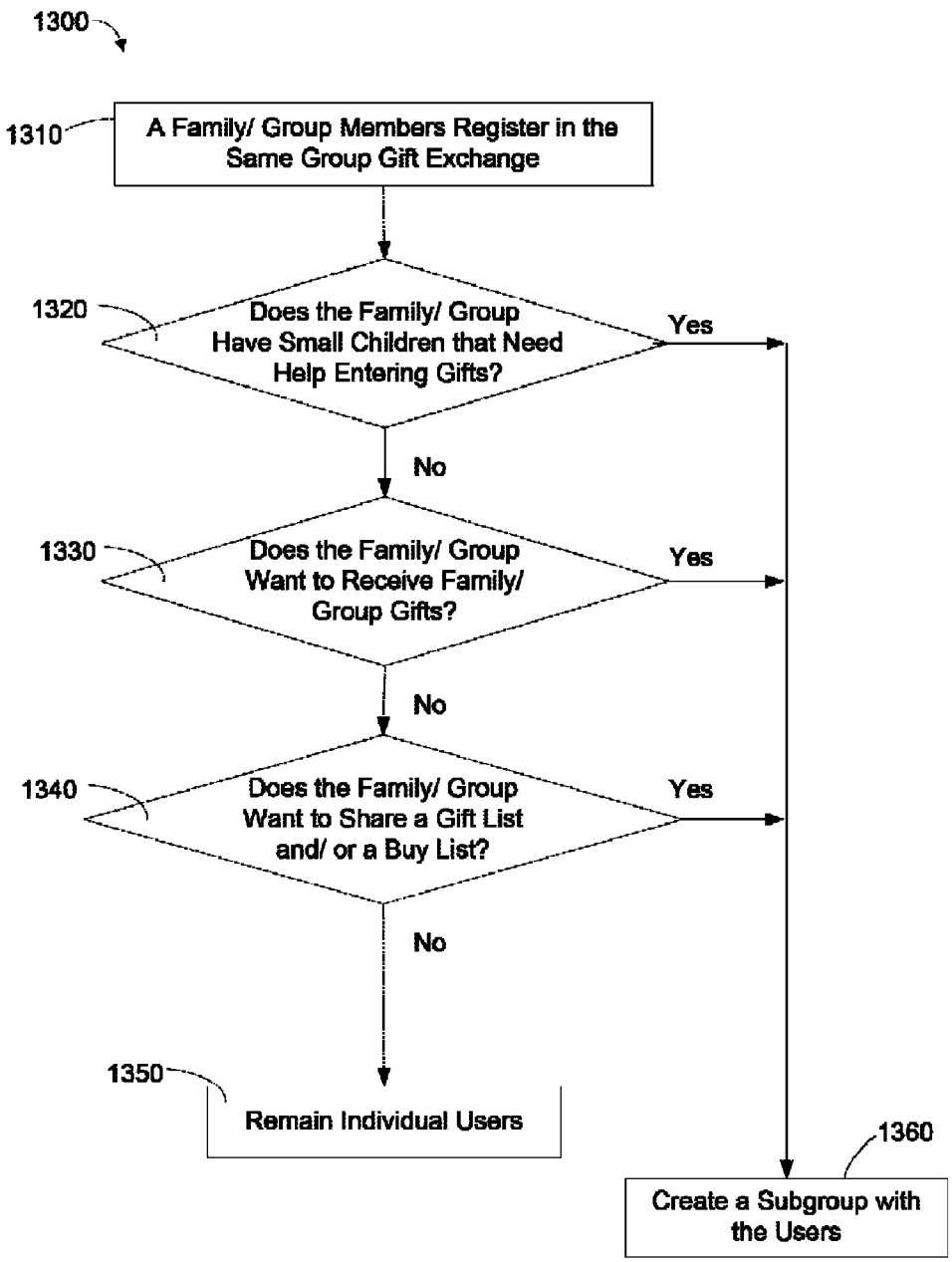
FIG. 13 is a flow diagram for a user deciding on a sub-group in accordance with an exemplary embodiment.

FIG. 13 is a flowchart 1300 for the process of deciding what type of users to form a subgroup. The flowchart assumes at least two users and gives several example reasons for choosing to form a subgroup. A subgroup has many benefits, for example a Wish List shared between the group in addition to each user having a personal Wish List.

According to block 1310, a family or group members register in the same group gift exchange. For example, family members register for a birthday or holiday gift exchange.

According to block 1320, a question is asked whether the family or group has small children that need assistance entering gifts. For example, one or more family members are too small or unable to use or access a computer for communicating with the system. If the answer to the question is "yes" then flow proceeds to block 1360 and a subgroup is created for these users. If the answer to this question is "no" then flow proceeds to block 1330.

According to block 1330, a question is asked whether the family or group desires to receive family or group gifts. For example, one or more family members may want to collectively receive a single gift for multiple persons in a group. In this manner, one user can buy a single gift for a family or group of individuals. If the answer to the question is "yes" then flow proceeds to block 1360 and a subgroup is created for these users. If the answer to this question is "no" then flow proceeds to block 1340.

According to block 1340, a question is asked whether the family or group wants to share a gift list and/or buy list. If the answer to the question is "yes" then flow proceeds to block 1360 and a subgroup is created for these users. If the answer to this question is "no" then flow proceeds to block 1350 where subgroups are not formed and members remain as individuals.

One embodiment uses gift data and gift metadata. Gift data describes the gift, and gift metadata is the information about each gift that the application uses to manipulate functionality of the website and/or graphical user interface. A member adds a new gift into the system by entering a gift title, a gift description, a price, gift priority, hyper link where the item can be found on the web, whether it is a Sub Group gift, and other information about each gift. A few select gifts, which are most desired, can be marked as "Priority" gifts. Since priority gifts are visually marked, other members know the importance of the gift to the member.

Gifts have certain properties and information upon which the application hides or displays depending upon the user viewing the list. The author of the gift cannot view the gift availability of his or her own gifts, as this would take away the element of surprise. In other words, the author of a gift is not able to determine which one or ones of his or her gifts are being purchased or selected for purchase by other group members.

When a gift is denoted as a Sub Group Gift or Family Gift, the gift behaves differently and appears at the bottom of the Wish List for all the Sub Group members. There is also gift information that is stored when certain events take place, such as a gift being marked as "Gift Taken."

The Wish List is a container for all of the gifts entered by each user. Each gift contains basic information about the item, such as the title, description, price, a link where the gift can be found on the Internet, gift type, the gift availability and other information about each gift. The Wish List is the group of gifts that the user is hoping to receive. Users go to the Wish List in order to add new gifts, edit existing gifts and delete gifts from their Wish List. Each member's Wish List is the list in which every member views for gift information but not all of the Wish List information is displayed to each member. Specifically, the gift owner is not able to view the gift availability of their own gifts as this would spoil the surprise of a gift exchange. Also, when a member is viewing another member's Wish List, the viewing member will observe that some gifts have already been claimed by other members. These gifts cannot be chosen to be purchased because another member has already claimed that right. Gifts in the Wish List can be sorted by a few properties such as date added, price, availability and other information.

Wish Lists display two broad types of gifts, individual gifts and Sub Group Gifts (also known as Family Gifts). Sub Group Gifts are gifts that are for the small group such as a family board game, a puzzle, etc. These gifts are entered into the system the similar way an individual gift is added: the member checks a box denoting a Sub Group Gift. In order to list a Sub Group gift, the member has to belong to a Sub Group. Every Wish List owned by a Sub Group member has two sections, individual section and a Sub Group section. Those members not in a Sub Group do not have a Sub Group section. The same list of Sub Group Gifts is displayed for every member in the Sub Group under the Sub Group section of the Wish List.

Upon entering a new gift into the application, the gift Availability Status is set as "Available" meaning the gift can be taken and purchased by other participating members. Once another member claims the gift, the status of the gift will change to "Unavailable" or "taken". The other members will not know who has chosen to get the gift but only that the gift is no longer available for giving or selection.

When viewing other members' Wish Lists, group members will also be shown advertisements related to the items in the Wish Lists. The ads are customized to assist the group members in finding a gift requested in another member's Wish List. The advertisements that appear on the Wish List portion of the application are filtered based upon the gift listed above the advertisement. The gift titles and gift descriptions are used to return relevant results in the form of ads that could be very beneficial to the group members. For example, if one of the other group members listed a particular model of digital camera, the brand and model could be used to filter the advertisement search results, presenting the group member with multiple places to purchase the item or the best prices for an item listed in the advertisement.

The Buy List is a feature built into the system that helps organize gift purchasing. The Buy List keeps track of gifts a member has chosen to get for other members in the group, as well as the purchase status of those gifts. When a member chooses to get a gift for another member, they navigate to the appropriate gift within another member's Wish List and interact with the system to claim the gift. Next, the gift is added to the member's Buy List with the Purchase Status set to Not Purchased (taken but not purchased). This gift is no longer available for other group members to purchase. When the member has physically purchased or acquired the gift they can go back to their Buy List and change the status of that gift to "Purchased". This helps the member keep track of which gifts from the system are purchased and which gifts still need to be purchased. The gifts in the Buy List are organized by member name and have the ability to be sorted by different parameters such as date, purchase status and alphabetically by member name. The purchase status data is only available to the owner of the Buy List.

In one embodiment, the Buy List is dynamic and allows multiple options for users in Multiple Groups and Sub Groups. A Buy List will display all gifts from one or more groups, regardless of the number of Groups a user is enrolled in. The ability of the Buy List to span groups is only applicable to a user that is in multiple groups. It provides all of the Buy List information for that user regardless of the current group. There is an extra option regarding Buy List content for users in a Sub Group. Normally, the Buy List is comprised of gifts selected by one group member. The additional option available to the users within a Sub Group is to have the ability to share a Buy List between the Sub Group members. In other words, every member of the sub group can view, add gifts and return gifts to the same Buy List. An exception is that the gifts that are taken off of other individual Sub Group member Wish Lists are not displayed to the gift owner on the shared Buy List. In other words, a sub group member would not be able to see one of their own gifts in the Sub Group Buy List (or shared Buy List). For example, suppose members A, B and C are in a Sub Group. If member A chooses a gift for member B, member B will not be able to view this gift on the shared Buy List. However, member C will be able to view the gift for member B in the Shared Buy List. When a shared Buy List is chosen to be printed, the application asks if the user wants to included the intra-group gifts. Lastly, a shared Buy List can be filtered to display only the current Group gifts or even use a different shade of color to denote gifts from another group.

The Buy List can also host advertisements that are helpful for both the company that hosts the application and the members that use the application. Advertisements are displayed on the Buy List pages that are helpful in terms of ad revenue for the hosting company. The ads can come from a service in which the advertisements are tailored based upon the page content. The title and description can be used as content on which to filter or query the advertisement listings. The advertisements will be beneficial to the group members as it will provide price selection and different retail choices right on the group member's Buy List page. For example, member A chooses the gift "Rubber Over-Shoes" from member B's Wish List. When member A views his/her Buy List there will be a few advertisements listed on the page in which different retailers are providing a link to their Rubber Over-Shoes and possibly providing the price in the advertisement.

Groups can be formed around a variety of individuals. For example, a group within the application is defined to be a group of people that know each other or have something in common. For example a group might be coworkers, friends or a family. The application is designed to host many groups at the same time; these groups usually act independent of the other groups. A group is composed of individuals and zero or more Sub Groups. Further, two groups can exist in the system without any of the members of either system knowing about each other. Members could also be in one or more groups. Members can be in only one Sub Group per group but if the member is in multiple groups, the member can be in many Sub Groups, one per group.

A Sub Group is comprised of two or more Group members that choose to be associated with each other; there are many options associated with a Sub Group. An example of a Sub Group would be a four-person family that would like to have a common Wish List in addition to individual gift lists. The common Wish List shared by all members in the Sub Group is a Wish List composed of gifts that are for all the members of the Sub Group. By way of example a Sub Group can choose one of two Wish List options. First, the Sub Group could choose to share one Wish List. The second option is that members would have their own Wish List in addition to a shared Wish List for the Sub Group. The members in a Sub Group can choose to share a common Buy List or they each have an individual Buy List. Sub Groups can also extend permission to members within the Sub Group to administer the Wish Lists of the other Sub Group members. For example, a family made up of two adults and one child can benefit from this feature. The parents can manage both children's Wish Lists without having to login as the child.

There are several tools within the system that enable the members to organize gift giving, communicate with each other, set system preferences and facilitate a group gift exchange. Examples of such tools include, but are not limited to, a Shopping Checklist, Community Posts, Messaging, Notifications, Budget Management, Random Gift Assignment and Group Administrator Controls.

The Shopping Checklist is a tool for keeping track of gift recipients outside of the application. This tool allows users to use the application to be the single place of record for gift giving. This list is similar to the Buy List, in that it stores gifts, their recipients and the purchase status of each gift. The next couple of tools, the Community Post and Messaging, provide all members with tools for communication within their group.

The Community Post tool provides all members in the group with the ability to post a message or reply to a current post, within the Group news board. This tool provides a way for all of the group users to post messages to the rest of the group. Once a topic is posted, any of the other group members can reply to this post once or more times. The next tool provides the ability to communicate to a select person or people within the group.

The Messaging tool provides a way for members to communicate with other members of their group via individual messages sent back and forth. It provides a way to send private messages to select group members. The Messaging tool can be compared to a slim down version of email, except the only recipients available are the other group members. The Community Post and the Messaging tool both allow communication between the members of the group; this next tool provides communication between a member and the system.

The purpose of the Notification tool is to notify members of events that happen within the system. Members create notifications by subscribing to an event. Here are a few examples of events, when a certain member enters a new gift, when a member edits a gift, and when a certain member logs into the system. When that event occurs the subscriber would be notified that the event took place. Members have the ability to subscribe or unsubscribe to one or multiple notifications. Notifications can be sent to the member's Messaging tool.

The History Tool gives the user a chance to recall previous actions as well as view the Wish List of a group member that the was recently viewed. When working within an application, users can make mistakes. This tool will give group members the ability to back and undo the last few commands. For example, if a user chooses to delete one of their gifts by accident, the member simply chooses to undo that item and the deletion is reversed. The History Tool also allows a member to recall the Wish List of another group member that has been recently viewed.

The application's Budget tool provides members with a way to plan and keep track of their gift exchange expenditures. The tool provides the user with financial information based upon group data and individually entered data. The tool is capable of providing information such as overall gift expenditures and a guideline for gift pricing based on a desired expense amount. The tool provides views of the information using pie charts, max spending charts and has the possibility to move the information into your current financial planning software. It will be possible for financial institutions to provide information about financing and give a member the ability to sign up for a line of credit loan or other financial help within the site.

The Group Administration tool has many purposes, such as paying any fees associated with the service usage, invite new members to the group, set preferences within the site, general administration for the group such as adding or removing group members, resetting passwords and setting up Sub Groups. The Administration Controls are only visible to the group administrator or group creator.

The System tools are not for members of the site, they are for the Group Gift Exchange administrators. The System Tools include one interface to create new accounts, organize billing, collect payments, store and retrieve customer data, manage relations between partners and check system statistics. This interface facilitates all the management necessary to keep start and perform upkeep on the site.

Upon signing up, the user to create the group with the application can choose to be the group administrator, volunteer another group member to take this role or choose to have all members administer the group; there are certain abilities of the administrator. The administration can invite members via email or other means to become members within a new group. The administration does this by accessing certain menus that allow the addition of new users. The administration simply provides the required information; this makes each group virtually self sustaining. Members of the group can be invited via email or simply with the login information. The administrator/s can set up Sub Groups and a takes care of a few other group policy settings. The administrator can create the usernames for all of the new members and is responsible for notifying them by email or another way. Upon receiving the welcome email the new member follows the link provided, signs into the system with temporary information. Upon entry for the first time, the new member is prompted to setup their own account by and entering a small amount of information such as a new password and username for their member account within the system, clothing size information and other general questions regarding gifts. The administrators set any and all group settings and preferences for the Group.

Exemplary embodiments can also handle situations in which existing members can be included in more than one group. If a current member accepts an invitation to be part of another group within the application, that member would be able to accept the invitation and would then be part of both groups. The member would then choose which group to work within after logging into the system or they can have the option of working with both groups at the same time. The only sections in the system that are enabled to view data from both groups are the Buy List and Shopping Checklist sections.

The group administrator can pick and choose how the rules will be enforced upon signing up the group. Some rules revolve around choosing gifts from other member's Wish Lists and editing gifts on a member's own Wish List.

The first rule is called the Return Date rule and is apparent when choosing to get a gift for another group member. Once a gift appears on the member's Buy List, the rule comes into effect. The rule states that when a gift is marked as "Gift Taken" it needs to be returned or marked as "Purchased" within three days or it will automatically be returned to the pool of available gifts after the three day period. The return date is three days by default and can be adjusted to five days, seven days or turned off by the group administrator.

The second rule is called the Responsible Edit Rule and it has three settings. This rule exists because editing a gift can be problematic if a member chooses to edit the details of a gift that another member has already chosen to get for that member. The three settings are On, Off and Notify. When this rule is turned on, the application provides the most protection to somebody that might have purchased a gift. Upon editing a gift, the application sends out a notification to all of the members in the group asking for permission to edit the gift. The gift owner has to wait 24 hours for the edit to take effect and can be notified by another group member that the edit would cause a problem. The owner then has another chance to commit the change to the gift.

The second setting for the Responsible Edit Rule is completely off, which gives the gift purchaser no protection from a gift they have on their Buy List from being editing. This setting does nothing to notify the user of a change in the gift details. The gift can be edited by the gift owner. The last setting is called the Notify and it provides the most flexibility to all group members. In the event that the gift has been edited under this setting, the application sends a notification to the member that has the gift on their Buy List. The notification includes the original gift information and the new changes. If none of the other members have this gift on their Buy List, there is no notification sent out and the gift is simply updated.

The Freeze Date rule puts a final day of editing and returning on the Wish Lists. This means that gift owners cannot edit gifts and members cannot return gifts from their Buy List on or after the Freeze Date. This rule was created to ensure that a bunch of gifts are not dumped back into the pool of free gifts without enough time for other members to put the gifts on the Buy List and purchase them. This date is set for five days, by default, in advance of the date of the party or gift exchange.

The Group Gift Exchange Algorithm is meant to be able to fit into an existing web site with ease. The existing website can create a new button on the page that once logged in can allow a user to add a gift to their Wish List from the host company's web site. One example of how this can be achieved is that the company's website can be updated so that when the user presses the button, the gift information, such as title, description, price, and link is sent in XML directly to the web site hosting the Group Gift Exchange Algorithm.

The Group Gift Exchange can be a 2 Tier or N Tier application depending upon the size of the user base and wants for the hosting company. The application can be developed with multiple languages including but not limited to C#, Java, C++, PHP, Python, VB, etc. The data store can be anything from a flat-file database to a database server. The Group Gift Exchange can be developed to use Web Services and XML to increase operability so that the front end of the software application can be written in a different language than the middle tier or backend; for example a C# presentation and Middle Tier. The hosting and requesting operating systems can be any operating system. The Group Gift Exchange application can be accessed via a desktop application, web browser, any type of computer that has a web browser such as a laptop computer, desktop computer, hand-held, third party application, or virtually device with the ability to connect to another device.

With exemplary embodiments, a single or multiple individuals are not required to organize a gift exchange. Exemplary embodiments make distribution of the Wish List easier and create community among group members in the process. Embodiments also organize the gift giving, the information is available from any Internet Connected PC (or any connected PC that has the software depending upon the setup). Furthermore, exemplary embodiments offer tools to help in the organization and accuracy of gift shopping and provide an opportunity for the application host to place advertisements within the application. This is due to the fact that the members of the group frequently visit the application for updates to other member Wish Lists and to complete their gift giving.

Figure 14:
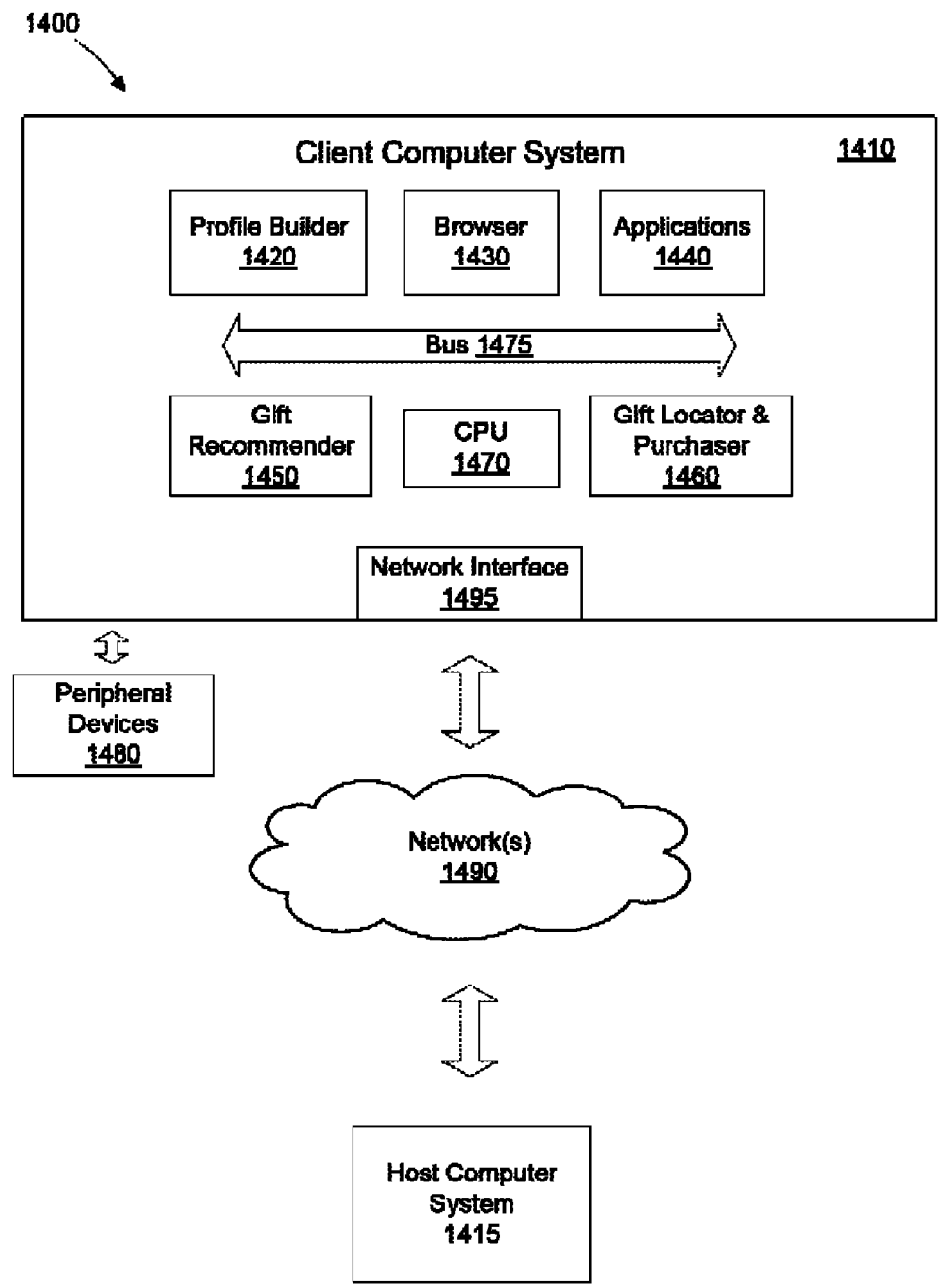
FIG. 14 is a diagram showing a client computer system connected to host computer in accordance with an exemplary embodiment.

FIG. 14 is a computer system 1400 showing a client computer system 1410 connected to host computer system 1415. By way of example, the client computer system includes electronic computing devices or computers such as computing devices 210 discussed in connection with FIG. 2; and host computer system 1415 includes computing devices or host computers discussed in connection with FIGS. 1 and 2.

The client computer system 1410 includes a user profile builder 1420, a web browser 1430, various applications 1440, a gift recommender 1450, a gift locator and purchaser 1460, and a CPU 1470 coupled together with one or more buses 1475. Further, the client computer system 1410 communicates with one or more peripheral devices 1480 and one or more networks 1490 through a network interface 1495.

The web browser 1430 is a software application on the client computer that allows a user to display and interact with text, images, videos, music and other information located on a web page at a website on the World Wide Web (WWW) or a local area network. Web pages can include hyperlinks to other web pages at the same or different website. By way of example, the web browser 1430 formats HTML information for display.

The software applications 1440 include any application stored or running on the client computer. By way of example, such applications include, but are not limited to, word processors, spreadsheets, media players, system software, etc.

Generally, the user profile builder generates or builds a user profile by monitoring and collecting data with respect to both internal and external computer information and operations. By way of example, internal data includes user behavior on the computer, installed client hardware, installed client software, locally stored client files, etc. External data includes information obtained or generated from a user interaction with web pages, email, peripheral devices, servers, etc. The profiler 1420 collects user behavior on the client computer, information about the user, information about the client computer, and/or any information about the computer's interaction with the network 1490.

Information collected by the profile builder 1420 is sent to the gift recommender 1450 for analysis. The gift recommender analyzes the collected information and provides gift recommendations for users of the computer. For example, the gift recommender assesses the collected information to determine if the user desires or needs a particular good or service. Recommendations for possible gifts are then provided to the user. If the user accepts the recommendations, the gifts are then automatically provider to the user's Wish List in the group gift exchange. Alternatively, the gifts are automatically applied to the user's Wish List and/or sent to other members of the group.

In one embodiment, the recommended gifts are secretly sent to the other members of the group gift exchange. In other words, the user is not aware what gifts are being recommended. In this way, the user can be surprised when he or she receives a gift since such a gift was not posted by the user on the group gift exchange. Instead, the gift was posted by the gift recommender 1450. The gift can be posted so the user does not have access to view which gifts the gift recommender 1450 posts on the user's Wish List.

The following examples illustrate some of the functionality of the gift recommender. During the course of a year, the user may navigate to websites directed to a favorite activity, sport, pass time, interest, or hobby. By way of illustration, the user may be interested in mountain biking, boxing, particular genre of music or books, sporting events, cooking, entertainment, etc. Repeated visits to websites, patterns, or word extraction techniques can be used to determine one or more of such interests of the user. Based on these interests, the gift recommender can make recommendations for gifts that the user desires or needs. Suppose for example that the user frequently navigates to a particular music web site or downloads a particular type of music. The gift recommender can recommend music to purchase based on this information. As another example, the gift recommender can recommend hardware or software for the user's computer based on analysis of its operating system, hardware, or loaded software. As another example, the gift recommender can recommend not only goods, but also services that the user would be interested in receiving or giving. As another example, peripheral devices coupled to or in communication with the client computer may be outdated or may have new or different software available. For example, the gift recommender can recommend a new type of printer, facsimile machine, notebook computer, scanner, etc.

The gift locator and purchaser 1460 searches the internet for the recommended gifts from the gift recommender 1450. A gift may be offered for sale at numerous web sites or store locations. The gift locator and purchaser 1460 crawls the internet to search for these locations and also determines the advertised prices for the gift at the locations. In one embodiment, the gift locator and purchaser crawls the internet without knowledge of the user and before the recommendations for gifts are presented to the user. For example, the user may enjoy wearing a certain style of clothing. The gift locator and purchaser 1460 searches the internet for web sites and stores that offer this particular style of clothing and gathers price information to determine which location offers the lowest price for particular items. The web sites, store locations, clothing, available sizes, available colors, price, etc. are presented, displayed, or sent to the user. If the user decides to purchase an item, the gift locator and purchaser 1460 can automatically navigate to the web site and automatically place the order for the user. For example, the client computer can store personal information of the user (such as address, credit card information, etc.) necessary to make the purchase for the user.

The gift recommender 1450 and gift locator and purchaser 1460 can assist the user in developing ideas for gifts for the group gift exchange. When a user is interested in a gift or selects a gift, the gift can be automatically added to the user's Wish List in the group gift exchange. Information about the gift (such as fields or boxes shown in FIGS. 4 and 6-9) are automatically provided to the group gift exchange algorithm and downloaded to the host computer system 1415 and into the application so the user is not required to type or enter this information into the GUI. In other words, detailed information about the user's gift on a Wish List is automatically provided and filled in by the group gift exchange application.

Generally, gift recommendation occurs in two stages. During the first stage, the profile builder 1420 monitors user activities and collects information used for creating a user profile. The profile builder monitors user's interactions with the browser, the user's interactions with other applications executing on client computer, activities performed by the user on external or peripheral devices 1480, etc. The profile builder collects both content information and context information for the monitored user activities and then stores this information in the client computer. By way of further illustration, the content information includes contents of web pages accessed by the user, graphical information, audio/video information, URLs visited, searches or queries performed by the user, items purchased over the internet, advertisements viewed or clicked, information on commercial or financial transactions, videos watched, music played, etc.

The profile builder 1420 also gathers and stores information related to the context in which the user performed the browser related activities. By way of example, such context information includes, but is not limited to, the order in which the user accessed the various web pages (user's browser navigation), a frequency or number of times a user navigated to a web location, information regarding the user's response to interactive advertisements and solicitations, information about the length of time spent by the user on the web pages, information on the time when the user accessed the web pages, etc.

As previously stated, the profile builder also collects content and context information associated with the user interactions with other applications 1440 executing on client computer. For example, the profile builder monitors and gathers data on the user's interactions with an electronic mail (email) application, or a word processor application, a spreadsheet application, a database application, or any other application executing on client computer. For example, the content information collected for each email may include the recipient information, sender information, email subject title information, and the information related to the contents of the email including attachments. By way of further example, a user may state in an email certain keywords or phrases that indicate the user desires, needs, or wants a product or service (such as "I want . . ." or "I would like to have . . ." or "I need . . ." or "For my birthday . . ." etc). This information is indicative that the user wants a certain product and can be added to the gift recommender for gifts in the gift exchange. Context information for an email application may include the time when the user receives emails, time when the user sends emails, subject matter of the emails, frequency of the emails, recipients, etc.

After information associated with the various user activities has been collected in the profile builder, this information is sent to the gift recommender 1450 during the second stage. During this second stage, gift recommendations are generated and presented to the user. In another exemplary embodiment, the gift recommendations are presented to other members of the group gift exchange.

Figure 15:
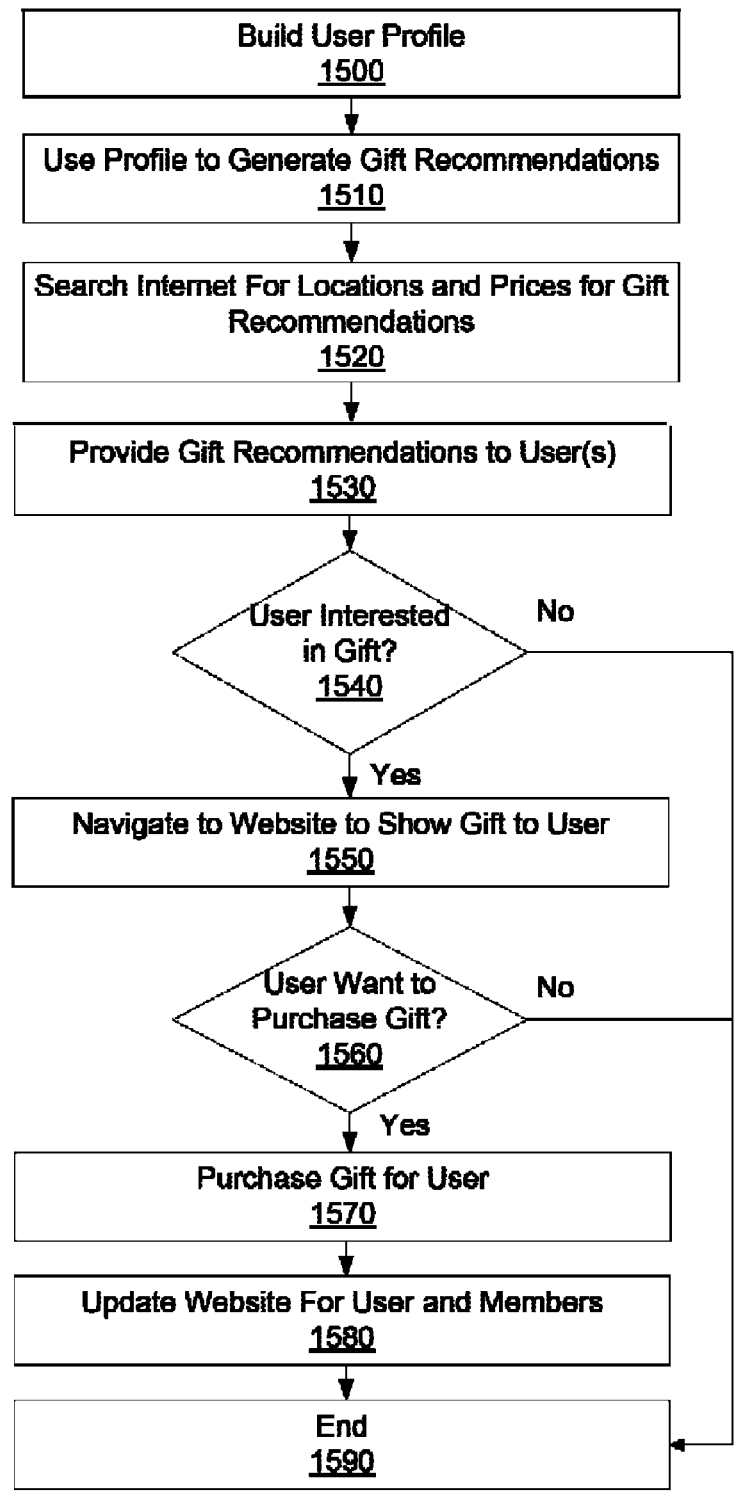
FIG. 15 is a flow diagram for providing gift recommendations to users in accordance with an exemplary embodiment.

FIG. 15 is a flow diagram for providing gift recommendations to users in accordance with an exemplary embodiment. According to block 1500, user activity on a client computer is monitored to build a user or client profile. The profile is used to generate one or more recommendations for gifts for the user according to block 1510. The gifts can include, for example, goods and/or services. Then according to block 1520, the internet is searched for locations and prices for the gifts in the recommendations. The recommendations are provided to the user according to block 1530. For example, the gift recommendations are displayed to the user on the client computer. If the user is not interested in a gift according to block 1540, then flow ends at block 1590. If the user is interested in a gift, then flow proceeds to block 1550 wherein more information about the gift is provided to the user. For example, the user is automatically navigated to a website to show a picture of the gift or to provide more information about the gift. The web site can include a location where the gift is offered for sale. The gift locator and recommender can also gather and store information about the gift (such as pictures, videos, or advertisements) and automatically present this information to the user. In one embodiment, this information is gathered and stored before the recommendations are provided to the user and without knowledge of the user. Thus, when a user is interested in a gift, the additional information is immediately presented to the user since the information is locally stored on the client computer. Then according to block 1560, a determination is made as to whether the user is interested in purchasing the gift. If the user is not interested in purchasing the gift, then flow ends at block 1590. If the user is interested in purchasing the gift, then flow proceeds to block 1570 where the gift is automatically purchased for the user. Here, the user can be presented with the different prices discovered on the internet or store locations. For example, the prices are presented to the user in a hierarchy from lowest price to highest price. Once the gift is purchase, the group member exchange is automatically updated according to block 1580. Flow then ends at block 1590.

The group gift exchange application is automatically updated when a user purchases a gift. This update occurs, for example, when the user purchases a gift for another member or for himself or herself. By way of illustration, assume that user A desires a downhill sled. User B selects the sled to notify other group members that user B will be buying the sled for user A. Later, user B navigates to a website and purchases the sled over the internet. Upon purchasing the sled, the group gift exchange application is automatically updated so the sled is marked as being "purchased" for user A. This automatic updating of the group gift exchange application can even occur immediately after user B purchases the sled at a retail store. For example, the credit card information of user B records a purchase of a sled. This information is passed to the group gift exchange application for automatic updating the sled as being "purchased" for user A.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

Definitions: As used in the specification and the claims, the following words are defined as follows:

The word "group" means two more individuals (i.e., human beings) that have a unifying interest.

The word "member" means one of an individual of a group. Members in a group gift exchange are limited to certain number of individuals who perform a specified task or have a common interest. For example, in order for an individual to become a member of a group gift exchange, the individual is first invited to join the group then accepts to become a member.

Blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
    establishing at a website a group of individuals desiring to exchange gifts with each other to celebrate an event;
    monitoring, by the computer, activity on the computer of a member of the group to build a profile of the member;
    generating, by the computer and based on the profile of the member, recommendations for gifts that the member desires to receive to celebrate the event;
    presenting, by the computer, the recommendations for gifts to the member so the member can accept the recommendations for gifts;
    transmitting, by the computer and after the member accepts the recommendations for gifts, descriptions of the gifts accepted by the member to the website so other members of the group can select one of the gifts to purchase for the member.

2. The method of claim 1 further comprising: retrieving, by the computer, pictures of the gifts before the recommendations for the gifts are presented to the member.

3. The method of claim 1 further comprising: retrieving, by the computer, prices at different websites for the gifts before the recommendations for the gifts are presented to the member.

4. The method of claim 1 further comprising:
    providing an interface at the computer for the member to view pictures of the gifts that are recommended based on the profile of the member;
    determining at the interface whether the member desires to add one of the gifts to a group gift exchange at the website.

5. The method of claim 1 further comprising: crawling, by the computer, an internet to determine websites where the gifts are offered for sale, wherein the computer crawls the internet before the recommendations for the gifts are presented to the member.

6. The method of claim 1 further comprising: automatically transmitting, by the computer, to the website the descriptions of the gifts, prices for the gifts, and hyperlinks where the gifts are located for sale.

7. The method of claim 1 further comprising:
    receiving an indication from the member that the member wants to purchase one of the gifts;
    in response to the indication, automatically navigating the computer to a website that offers the one of the gifts for sale.

8. A tangible computer readable storage medium having instructions for causing a computer to execute a method, comprising:
    registering a user at a website to join a group of individuals desiring to exchange gifts with each other over the website to celebrate an event;
    monitoring, by the computer, activity of the user so the computer can build a user profile of the user;
    recommending, by the computer and based on the user profile, gifts that the user desires to receive to celebrate the event;
    selecting, by the user, gifts recommended by the computer; and
    transmitting the gifts selected by the user to a host computer for display on the website so the group of individuals can select one of the gifts to purchase for the user.

9. The tangible computer readable storage medium of claim 8 further comprising, crawling an internet to determine prices for the gifts before recommendations for the gifts are provided to the user.

10. The tangible computer readable storage medium of claim 8 further comprising, crawling an internet to gather pictures of the gifts before recommendations for the gifts are provided to the user.

11. The tangible computer readable storage medium of claim 8 further comprising:
    gathering descriptions and prices for the gifts before the user is presented with recommendations for gifts;
    transmitting the descriptions and the prices to the host computer after the user selects the gifts.

12. The tangible computer readable storage medium of claim 8 further comprising:
    determining a type of peripheral device connected to the computer;
    recommending a new peripheral device to the user as a recommendation for one of the gifts.

13. The tangible computer readable storage medium of claim 8 further comprising:
    receiving an indication from the user that the user is interested in purchasing one of the gifts;
    automatically navigating the computer to a website that offers the one of the gifts for sale upon receiving the indication from the user.

14. The tangible computer readable storage medium of claim 8 further comprising:
    filling a text field at the website with information that describes one of the gifts;
    filling a text field at the website with price information for the one of the gifts;
    providing the website with a picture of the one of the gifts.

15. The tangible computer readable storage medium of claim 8 further comprising: secretly transmitting, without knowledge of the user, a recommendation for a gift that the user desires to the host computer for display on the website, wherein the user is unable to view the recommendation for the gift at the website.

16. A computer, comprising:
    a memory storing an algorithm; and
    a processor executing the algorithm to:
    navigate to a website where a group of individuals desire to exchange gifts with each other to celebrate an event;
    monitor activity of a member of the group to build a profile of the member;
    use the profile of the member to generate recommendations for gifts that the member wants to receive to celebrate the event;
    present the recommendations for gifts to the member so the member can accept the recommendations for gifts; and
    transmit, after the member accepts the recommendations for gifts, the gifts accepted by the member to the website so other members of the group can select one of the gifts to purchase for the member.

17. The computer of claim 16, wherein the processor further executes the algorithm to crawl an internet to retrieve pictures of the gifts before the member is presented with the recommendations for gifts.

18. The computer of claim 16, wherein the processor further executes the algorithm to crawl an internet to retrieve prices of the gifts before the member is presented with the recommendations for gifts.

19. The computer of claim 16, wherein the processor further executes the algorithm to determine which retail stores sell the gifts before the member is presented with the recommendations for gifts.

20. The computer of claim 16, wherein the processor further executes the algorithm to determine which internet websites offer the gifts for sale before the member is presented with the recommendations for gifts.

* * * * *